(12) United States Patent
Kim et al.

(10) Patent No.: US 6,801,290 B2
(45) Date of Patent: Oct. 5, 2004

(54) LIQUID CRYSTAL DISPLAY DEVICE WITH SPACERS INTEGRALLY FORMED AT PLASTIC SUBSTRATE

(75) Inventors: Hyang Yul Kim, Kyoungki-do (KR); Jin Mahn Kim, Kyoungki-do (KR); Seung Hee Lee, Cheollabuk-do (KR)

(73) Assignee: Boe-Hydis Technology Co., Ltd., Kyoungki-do (KR)

( * ) Notice: Subject to any disclaimer, the term of this patent is extended or adjusted under 35 U.S.C. 154(b) by 0 days.

(21) Appl. No.: 10/331,967

(22) Filed: Dec. 30, 2002

(65) Prior Publication Data

US 2003/0151715 A1 Aug. 14, 2003

(30) Foreign Application Priority Data

Feb. 7, 2002 (KR) .................................... 10-2002-6981

(51) Int. Cl.[7] ............................................ G02F 1/1339
(52) U.S. Cl. ........................ 349/156; 349/155; 349/158
(58) Field of Search ............................... 349/155, 156, 349/158, 160

(56) References Cited

U.S. PATENT DOCUMENTS

| | | | |
|---|---|---|---|
| 5,268,782 A | * 12/1993 | Wenz et al. | ................ 349/156 |
| 5,365,356 A | * 11/1994 | McFadden | ................... 349/187 |
| 5,739,053 A | 4/1998 | Kawakita et al. | |
| 5,956,112 A | * 9/1999 | Fujimori et al. | ............. 349/156 |
| 6,127,199 A | 10/2000 | Inoue et al. | |
| 6,136,444 A | * 10/2000 | Kon et al. | ................ 428/423.1 |
| 6,146,716 A | 11/2000 | Narang | |
| 6,166,797 A | * 12/2000 | Bruzzone et al. | ............ 349/155 |
| 6,236,063 B1 | 5/2001 | Yamazaki et al. | |
| 6,285,834 B1 | 9/2001 | Hylen | |

* cited by examiner

*Primary Examiner*—Tarifur R. Chowdhury
*Assistant Examiner*—Andrew Schechter
(74) *Attorney, Agent, or Firm*—Ladas & Parry LLP

(57) ABSTRACT

A liquid crystal display device with spacers integrally formed at a plastic substrate. The liquid crystal display device comprises: upper and lower substrates joined with liquid crystals interposed there-between, at least one substrate of which is made of plastic; a driving electrode for the liquid crystals formed at the lower substrate; polarizers attached at respective rear surfaces of the upper and lower substrates; and spacers interposed between the upper and lower substrates to maintain cell gaps, wherein the spacers are integrally formed at the substrate, and concurrently act as posts. Also, spacers can be integrally formed at either one of the lower plastic substrate and the upper plastic substrate, or the spacers can be integrally formed at both the lower plastic substrate and the upper plastic substrate, and the spacers have a height of "cell gap±a", wherein the cell gap is 0.2 to 10 $\mu$m and "a" is not more than 1 $\mu$m.

3 Claims, 5 Drawing Sheets

LIQUID CRYSTAL DISPLAY DEVICE WITH SPACERS INTEGRALLY FORMED AT PLASTIC SUBSTRATE

BACKGROUND OF THE INVENTION

1. Field of the Invention

The present invention relates to a liquid crystal display device, and more particularly to a liquid crystal display device having plastic substrates with integral spacers that concurrently act as supporting posts, which can prevent the deterioration of pictures resulting from non-uniformity of the disposition of spacers.

2. Description of the Prior Art

As generally known in the art, a liquid crystal display device has been generally employed as a means for representing information in a communication terminal, following the development of wireless mobile communication. Further, because consumers require diverse characteristics such as a high quality of the terminal, mobility, ability to do a large amount of information processing, light-weight, and ability to prevent breakage occurring by being dropped during use, various technologies have been developed to satisfy such requirements. For example, glass materials have been substituted with plastic materials as a substrate in order to prevent the glass substrates of a mobile terminal from being broken resulting from dropping during use.

Meanwhile, it is necessary to form a thin film transistor (TFT) on a plastic substrate in order to process large amounts of information at one time and to make the communication terminal light. For this purpose, high polymer materials such as polycarbonate, polyimide, PES (polyether sulfone), PAR, PEN (polyethelene), and PET (polyether) are employed as materials for a plastic substrate, and the heat resistant temperature limit of the polymer materials is about 150 to 200° C.

Further, as regards a conventional liquid crystal display device employing glass substrates, response speed, contrast ratios, sight angle, luminance uniformity, etc., are closely related to the thickness of the liquid crystal layer, that is, the cell gap of the liquid crystal display device. Accordingly, spherical spacers are scattered in a space made between the substrates in order to maintain a uniform cell gap in the conventional liquid crystal display device.

As regards the scattering method for the spaces, in a dry method, spacers are electrified to result in uniform scattering of the spacers by the repulsive power of spacers with the same polarities, and in a wet method, spacers are scattered after they are mixed with solvents such as IPA, etc. Generally, the dry method above has been employed in the method for fabricating a TFT-LCD (thin film transistor liquid crystal display device), as it is comparatively better in scattering uniformity characteristics.

Accordingly, in the case of a communication terminal with mobile functions and employing plastic substrates, spacers necessarily must be scattered by the dry method or the wet method in order to maintain a uniform cell gap between substrates in the fabricating process.

However, in the case of the liquid crystal display device employing plastic substrates and in which spherical spacers are scattered, the plastic substrates can be curved or curled like paper, which phenomenon is related to the flexible characteristics of the plastic substrates. As a result, luminance non-uniformity has been produced at a specific gradation while driving a gray scale.

SUMMARY OF THE INVENTION

Accordingly, the present invention has been made to solve the above-mentioned problems occurring in the prior art, and an object of the present invention is to provide a liquid crystal display device with spacers integrally formed at plastic substrates, which can prevent luminance non-uniformity produced from drifts and conglomerations of the spherical spacers.

In order to accomplish this object, there is provided a liquid crystal display device with spacers integrally formed at plastic substrates, the liquid crystal display device comprising: upper and lower substrates joined with liquid crystals interposed there-between, at least one substrate of which is made of plastic; a driving electrode of the liquid crystals formed at the lower substrate; polarizers attached at respective rear surfaces of the upper and lower substrates; spacers interposed between the upper and lower substrates to maintain cell gaps, wherein the spacers are integrally formed at the substrate, and concurrently act as supporting posts.

Further, spacers are integrally formed at either one of the lower plastic substrate or one of the upper plastic substrate, also the spacers can be integrally formed at both of the lower plastic substrate and the upper plastic substrate.

Also, the spacers have a height of "cell gap±a", wherein the cell gap is 0.2 to 10 $\mu$m and "a" is not more than 1 $\mu$m.

Additionally, the spacers are integrally formed with at least one plastic substrate either by a roll extrusion method employing a roll having concave patterns in the shape of the spacers or by a molding method employing mold frames having concave patterns in the shape of the spacers.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings.

Figure 1:
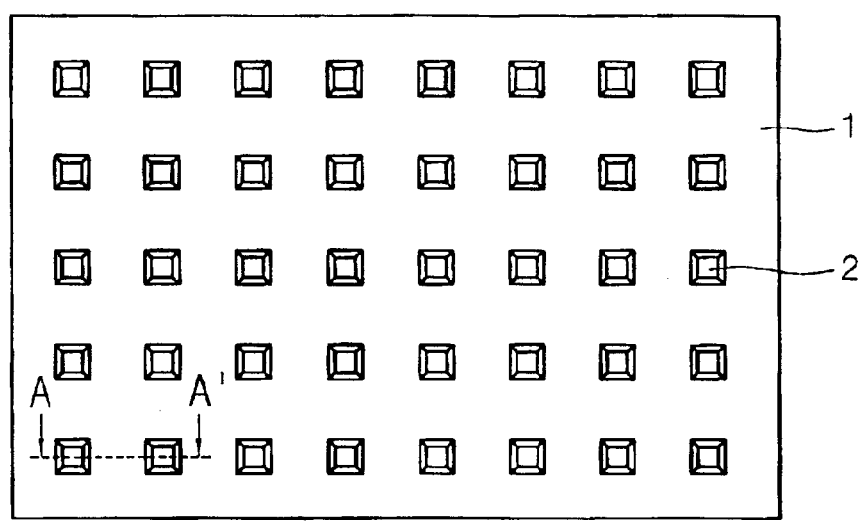
FIG. 1 is a planar view showing a plastic substrate equipped with spacers concurrently acting as supporting posts in accordance with one embodiment of the present invention.
Figure 2:
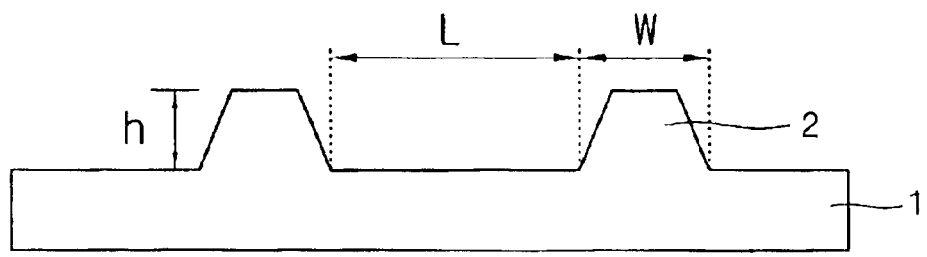
FIG. 2 is a sectional view taken along line A–A' in FIG. 1 in order to illustrate an interval L made between neighboring spacers and size W and height H of each spacer in accordance with the present invention.

Referring to FIG. 1, a plastic substrate 1 can be employed as either one or both of an upper substrate and a lower substrate in a liquid crystal display device for representing information in a communication terminal with mobile functions. Specifically, the plastic substrate 1 includes spacers 2 which concurrently act as supporting posts to maintain intervals, i.e., cell gaps made between neighboring substrates.

In the case of plastic substrate 1 equipped with spacers which act concurrently as posts as explained above, spacers are preferably formed in a ladder shape, and can be formed in any shape selected from rectangular, cylindrical, or hemispherical shapes.

Further, the spacers that act as posts are preferably formed at regions at which light is not leaked. For example, when a lower substrate is made of plastic having spacers that act concurrently as supporting posts, the spacers 2 can be formed on a gate bus line or a data bus line, and when an upper substrate is made of plastic, the spacers 2 can be formed on a black matrix.

Additionally, a width W of the spacer 2 and an interval L made between neighboring spacers 2 are set in consideration of widths of the gate and data bus lines in the lower substrate or a width of the black matrix in the upper substrate, together with consideration of density, etc. Also, the height h of the spacers 2 is determined to be "cell gap±a" in consideration of the height difference "a" of the cell gap, the post spacer area and opening area (not shown). In this instance, the cell gap is 0.2 to 10 $\mu$m and "a" is not more than 1 $\mu$m.

Figure 3:
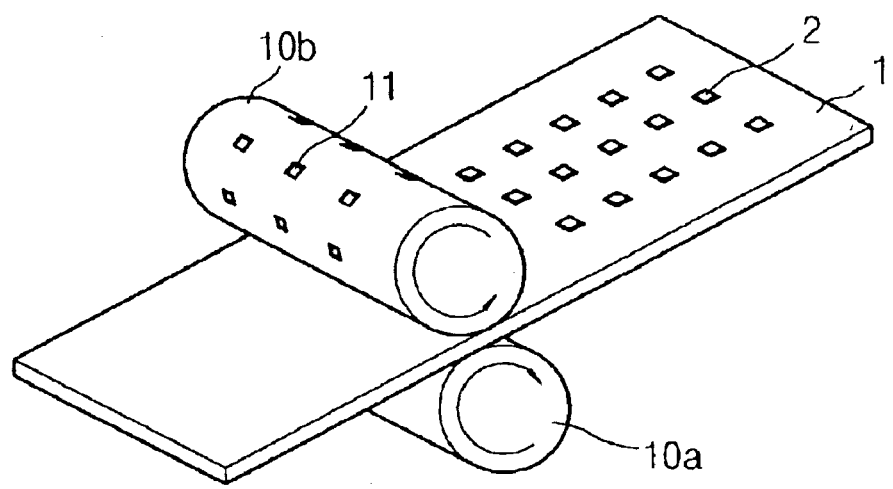
FIG. 3 and FIG. 4 are views showing a method for fabricating a plastic substrate with spacers that concurrently act as supporting posts in accordance with one embodiment of the present invention.
Figure 4:
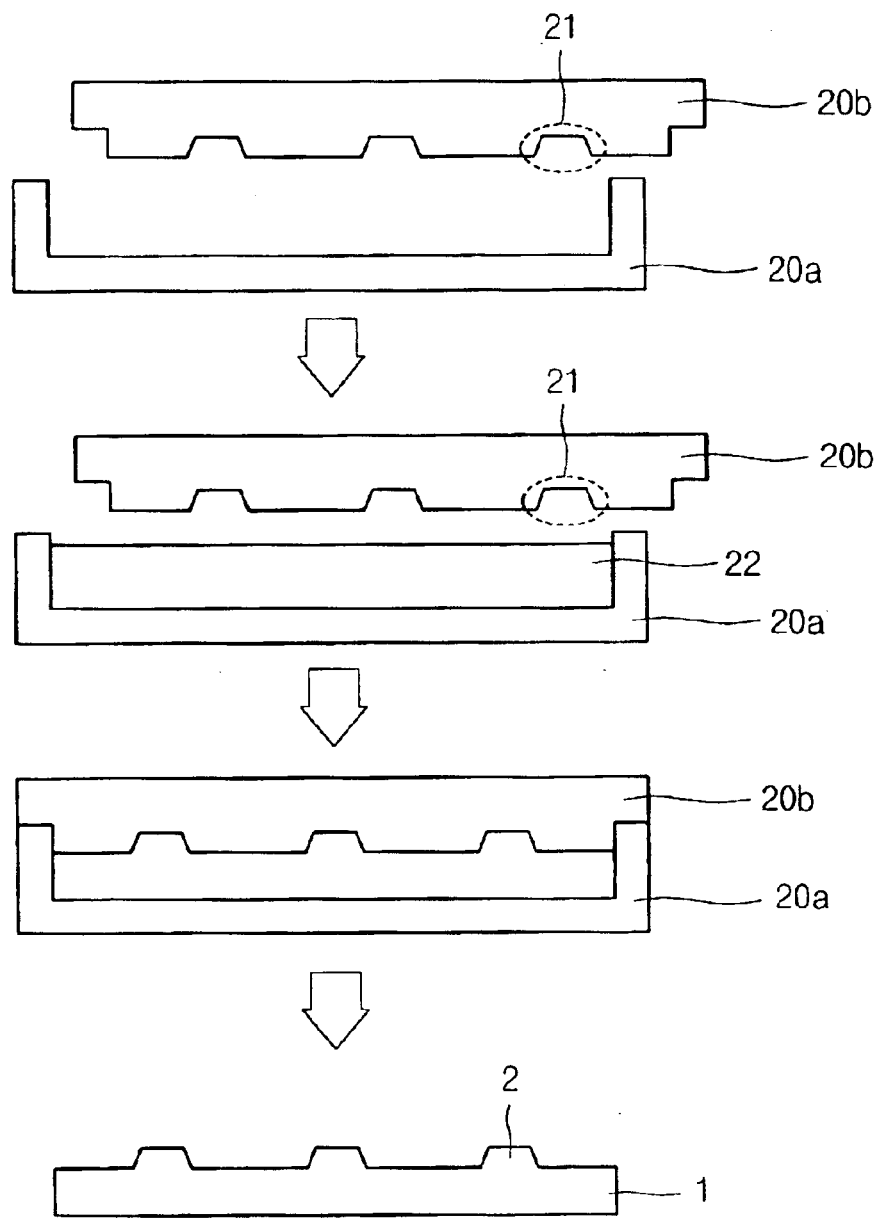

Meanwhile, in accordance with the present invention, as shown in FIGS. 3 and 4, a roll extrusion method employing a roll 10b having concave patterns 11 in the shape of the spacers or a molding method employing a mold frame 20b having concave patterns 21 in the shape of the spacers is used to fabricate a plastic substrate equipped with spacers that concurrently act as supporting posts.

Specifically, as shown in FIG. 3, when the roll extrusion method is employed, first creating the concave patterns 11 in the shape of the spacers on any one roll, for example, on an upper roll 10b, and then formable plastic materials are passed through a pair of rolls 10a, 10b to produce spacers 2 that concurrently act as supporting posts on the extruded plastic substrate 1.

When a molding method is employed, as shown in FIG. 4, first providing a lower mold frame 20a in a vessel shape and an upper mold frame 20b having concave patterns 21 in the shape of the spacers, and then pouring plastic solution 22 into the lower mold frame 20a, and compressing the plastic solution 22 with the upper mold frame 20b, and finally removing the mold frames 20a, 20b to produce the plastic substrate 1 having spacers that concurrently act as supporting posts.

With regards FIGS. 5A to 5C, the liquid crystal display device, which has a plastic substrate with spacers that act as supporting posts of the present invention, is explained below.

Figure 5A:
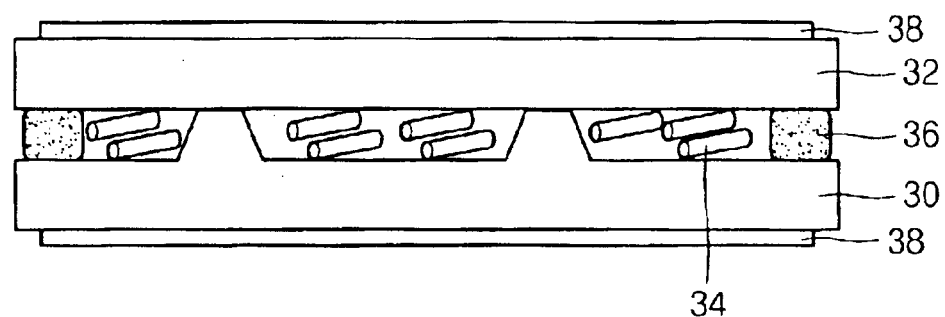
FIGS. 5a to 5c are sectional views showing a liquid crystal display device with plastic substrates having spacers that concurrently act as supporting posts in accordance with the present invention.

FIG. 5A is a sectional view showing the liquid crystal display device of the present invention, which employs a lower substrate made of plastic having spacers that act as supporting posts. As shown in the drawing, the lower substrate 30 made of plastic material and the upper substrate 32 are joined together with liquid crystals 34 interposed there-between by the seal materials 36, and polarizers are attached on respective outer surfaces of the substrates 30, 32. In particular, spacers that maintain intervals, that is, cell gaps, formed between substrates 30, 32 are made integrally with a plastic lower substrate 30.

Figure 5B:
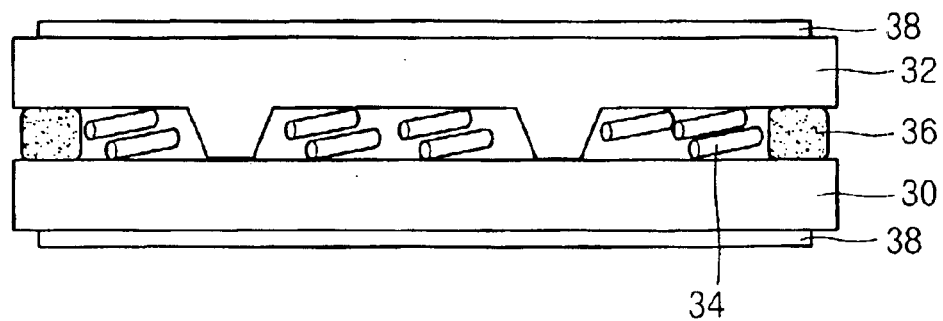

FIG. 5B is a sectional view showing the liquid crystal display device of the present invention, which employs an upper substrate made of a plastic substrate having spacers that act as posts. As shown in the drawing, the liquid crystal display device according to this embodiment of the present invention, has a similar structure to the prior embodiment of the present invention (as shown in FIG. 5A), and only the upper substrate 32 is fabricated of a plastic substrate having spacers that concurrently act as supporting posts.

Figure 5C:
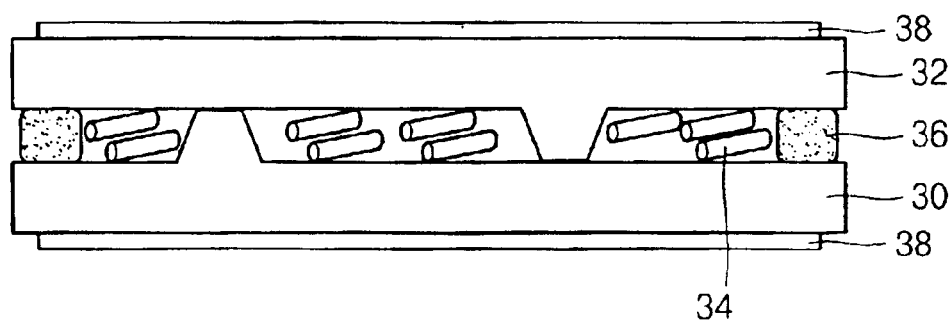

FIG. 5C is a sectional view showing the liquid crystal display device of the present invention, which employs an upper substrate and a lower substrate both made of plastic substrate having spacers that act as posts. As shown in the drawing, both the lower substrate 30 and the upper substrate 32 are made of plastic having spacers that act concurrently as supporting posts, so that it is required to adjust positions of the spacers properly.

According to the present invention as described above, the following advantages are achieved.

Even if the lower and upper substrates are curled or bent, drift of the spacers does not occur, owing to the flexible property of the plastic substrate. Accordingly, picture deterioration of the liquid crystal display device originating from the non-uniformity of the spacers is obviated, and production is effective in cost reduction of the products as no further processes are required to fabricate the spacers, which concurrently act as supporting posts.

As described above, the spacers are fabricated integrally with the plastic substrate so that drifts and conglomerations of the spacers can be obviated, resulting in maintaining the uniformity of cell gaps and improving the luminance and contrast ratios, thereby incorporating a high quality liquid crystal display device.

Also, according to the present invention, as the spacers are formed integrally with the plastic substrate to maintain the uniformity of cell gaps, no special process is required to form the spacers that act concurrently as supporting posts, and as a result, cost reductions can be achieved.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A liquid crystal display device having upper and lower substrates with a plurality of supporting posts integrally formed at both substrates, the liquid crystal display device comprising:

liquid crystals interposed between the upper and lower substrates made of plastic and separated at a cell gap;

a driving electrode for the liquid crystals formed at the lower substrate;

polarizers attached at respective rear surfaces of the upper and lower substrates; and the plurality of posts interposed between the upper and lower substrates, wherein a predetermined number of the posts are integrally formed at the upper substrate and the remainder of the posts are integrally formed at the lower substrate.

2. The liquid crystal display device of claim 1, wherein the height of each post is between 3 and about 11 $\mu$m to maintain the predetermined distance between the upper and lower substrates.

3. The liquid crystal display device of claim 1, wherein the posts are formed to correspond to the locations of gate bus lines or pixel bus lines or black matrices of the liquid crystal display device.

* * * * *